(12) United States Patent
Kahlen et al.

(10) Patent No.: US 12,104,049 B2
(45) Date of Patent: Oct. 1, 2024

(54) COMPATIBILIZATION OF RECYCLED POLYETHYLENE-POLYPROPYLENE BLENDS

(71) Applicant: BOREALIS AG, Vienna (AT)

(72) Inventors: Susanne Kahlen, Linz (AT); Hermann Braun, Linz (AT); Yi Liu, Linz (AT); Markus Gahleitner, Linz (AT); Gerhard Hubner, Linz (AT)

(73) Assignee: BOREALIS AG, Vienna (AT)

( * ) Notice: Subject to any disclaimer, the term of this patent is extended or adjusted under 35 U.S.C. 154(b) by 472 days.

(21) Appl. No.: 17/598,494

(22) PCT Filed: Mar. 26, 2020

(86) PCT No.: PCT/EP2020/058578
§ 371 (c)(1),
(2) Date: Sep. 27, 2021

(87) PCT Pub. No.: WO2020/201020
PCT Pub. Date: Oct. 8, 2020

(65) Prior Publication Data
US 2022/0186011 A1  Jun. 16, 2022

(30) Foreign Application Priority Data
Mar. 29, 2019 (EP) .................................. 19166174

(51) Int. Cl.
C08L 23/06 (2006.01)
C08J 3/00 (2006.01)
C08L 23/12 (2006.01)
C08L 23/16 (2006.01)

(52) U.S. Cl.
CPC ............... *C08L 23/16* (2013.01); *C08J 3/005* (2013.01); *C08L 23/06* (2013.01); *C08L 23/12* (2013.01); *C08L 2205/03* (2013.01); *C08L 2207/20* (2013.01)

(58) Field of Classification Search
CPC .......... C08L 23/06; C08L 23/12; C08L 23/16; C08L 2205/03; C08L 2207/20
See application file for complete search history.

(56) References Cited

U.S. PATENT DOCUMENTS

| | | | |
|---|---|---|---|
| 3,632,674 A | 1/1972 | Aishima et al. | |
| 5,663,130 A | 9/1997 | Emert et al. | |
| 5,767,230 A | 6/1998 | Scarola et al. | |
| 8,426,521 B2* | 4/2013 | Layman | C08L 23/10 525/240 |
| 10,059,785 B2* | 8/2018 | Kulshreshtha | C08J 11/04 |
| 11,512,189 B2* | 11/2022 | Kahlen | C08L 23/12 |
| 11,753,534 B2* | 9/2023 | Briggs | C08L 23/06 525/240 |
| 2012/0034454 A1* | 2/2012 | Schedenig | B32B 27/08 428/335 |

FOREIGN PATENT DOCUMENTS

| | | | | |
|---|---|---|---|---|
| CN | 108025826 A | 5/2018 | | |
| EP | 0254599 A1 | 1/1988 | | |
| EP | 1418205 A1 | 5/2004 | | |
| EP | 1789489 B1 | 9/2010 | | |
| JP | H11291279 A | 10/1999 | | |
| JP | 2001-114957 A | 4/2001 | | |
| KR | 20110119841 A | 11/2011 | | |
| KR | 20180066257 A | 6/2018 | | |
| WO | 2015/169690 A1 | 11/2015 | | |
| WO | 2018/206353 A1 | 11/2018 | | |
| WO | WO-2019224129 A1 * | 11/2019 | ............. | C08L 23/10 |
| WO | WO-2020169548 A1 * | 8/2020 | ............. | C08L 23/04 |
| WO | WO-2020169549 A1 * | 8/2020 | ............. | C08L 23/04 |

OTHER PUBLICATIONS

Busico, Vincenzo, et al., "Alk-1-Ene Polymerization in the Presence of a Monocyclopentadienyl Zirconium(IV) Acetamidinate Catalyst: Microstructural and Mechanistic Insights", Macromol. Rapid Commun. 2007, 28, 1128-1137.

Busico, Vincenzo, et al., "Full Assignment of the 13C NMR Spectra or Regioregular Polypropylenes: Methyl and Methylene Region", Macromolecules 1997, 30, 6251-6263.

Busico, Vincenzo, et al., "Microstructure of Polypropylene", Prog. Polym. Sci. 26 (2001) 443-533.

Castignolles, Patrice, et al., "Detection and quantification of branching in polyacrylates by size-exclusion chromotography (SEC) and melt-state 13C NMR Spectroscopy", Polymer 50 (2009) 2373-2383.

Cheng, et al., "13C NMR Analysis of Ethylene-Propylene Rubbers", Macromolecules 17, 1984, 1950-1955.

Filip, Xenia, et al, "Heteronuclear Decoupling Under Fast Mas by a Rotor-Synchronized Hahn-Echo Pulse Train", Journal of Magnetic Rosonance 176 (2005) 239-243.

Griffin, John M., et al. "Low-Load Rotor-Synchronized Hahn-Echo Pulse Train (RS-HEPT) 1H Decoupling in Solid-State NMR:Factors Affecting Mas Spin-Echo Dephasing Times", Magn. Reson. Chem. 2007; 45:S198-S208.

Klimke, Katja, et al., "Optimisation and Application of Polyolefin Branch Quantification by Melt-State 13CNMR Spectroscopy", Macromol. Chem. Phys. 2006, 207, p. 382-395.

(Continued)

*Primary Examiner* — Rip A Lee
(74) *Attorney, Agent, or Firm* — Tarolli, Sundheim, Covell & Tummino LLP

(57) ABSTRACT

The present invention is directed to a polyethylene-polypropylene composition comprising a blend (A) being a recycled material, said blend comprising polypropylene and polyethylene, and a compatibilizer (B) being a $C_2C_3C_4$ terpolymer. Further, the present invention is directed to an article comprising said polyethylene-polypropylene composition and a process for preparing said polyethylene-polypropylene composition. The present invention is also directed to the use of a compatibilizer (B) being a $C_2C_3C_4$ terpolymer for improving the impact-stiffness balance and the morphology of the blend (A).

14 Claims, No Drawings

(56) References Cited

OTHER PUBLICATIONS

Resconi, Luigi, et al., "Selectivity in Propane Polymerization With Metallocene Catalysts", Chem. Rev. 2000, 100, 1253-1345.

Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.

Pollard, M. Pollard, et al., "Observation of Chain Branching in Polyethylene in the Solid State and Melt Via 13C NMR Spectroscopy and Melt Nmr Relation Time Measurements", Macromolecules 2004, 37, 813-825.

Parkinson, Matthew, et al., "Effect of Branch Length on 13C NMR Relaxation Properties in Molten Poly[ethylene-co-(a-olefin)] Model Systems", Macromol. Chem. Phys. 2007, 208, 2128-2133.

Chinese Application No. 202080025032.0; Chinese office action dated Oct. 27, 2022; 5 pgs.

European Application No. 20713298.6, Notice of Opposition dated Feb. 7, 2024.

Degussa AG, Adhesive raw material for hot-melt applications. Vestoplast product brochure.

Safety Data Sheet Kelton 512, Apr. 9, 2004.

Technical Information Engage 8407, Apr. 23, 2020.

Tafmer Produktbroschure.

Applicant: Borealis AG; "Compatibilization of Recycled Polyethylene-Polypropylene Blends"; Korean Patent Application No. 10-2021-7034920; Notice of Allowance; Jul. 22, 2022; 3 pgs.

Applicant: Borealis AG; "Compatibilization of Recycled Polyethylene-Polypropylene Blends"; Korean Application No. 10-2021-7034920; Notice to Submit a Response, Mar. 10, 2022; 17 pgs.

Indian Application No. 202117049076; Indian Examination Report; Apr. 1, 2022; 7 pgs.

Irena Borovanska, et al.; "Quality Assessment of Recycled and Modified LDPE/PP Blends"; Article; Journal of Elastomers & Plastics 44(6), 2012, pp. 479-497; sagepub.co.uk/journalsPermissions.nav; DOI:10.1177/0095244312441731.

Marisa Cristina Guimaraes Rocha, et al.; Thermoplastic Elastomers Blends Based on Linear Low Density Polyethylene, Ethylene-1-Octene Copolymers and Ground Rubber Tire; Technical Scientific Papers; Polimeros, vol. 24, No. 1, (2014) pp. 23-29; http://dx.doi.org/10.4322/polimeros.2014.033.

United Arab Emirates Application No. P6001726, Office Action dated Jul. 8, 2024.

\* cited by examiner

COMPATIBILIZATION OF RECYCLED POLYETHYLENE-POLYPROPYLENE BLENDS

The present invention is directed to a polyethylene-polypropylene composition comprising a blend (A) being a recycled material, said blend comprising polypropylene and polyethylene, and a compatibilizer (B) being a $C_2C_3C_4$ terpolymer. Further, the present invention is directed to an article comprising said polyethylene-polypropylene composition and a process for preparing said polyethylene-polypropylene composition. The present invention is also directed to the use of a compatibilizer (B) being a $C_2C_3C_4$ terpolymer for improving the impact-stiffness balance and the morphology of the blend (A).

Mechanical recycling or polymer waste from various collection systems is the main target of present developments in the field. Mixed recycling of chemically similar polymers, like styrene homo- and copolymers or polyamides, is often seen as one way out of the sorting dilemma limiting the process. Polypropylene and polyethylene are certainly candidates for such mixtures, but their inherently limited compatibility and miscibility will normally make the application of some kind of compatibilization mandatory in order to obtain compositions with good mechanical performance.

It is well known in the art that a higher impact strength can be achieved through the addition of elastomers acting as compatibilizers such as ethylene-propylene rubbers which, however, limit the stiffness of the resulting compositions. Moreover, many of these elastomers are only available as higher molecular weight versions or in non-pelletized form, the latter requiring specific mixing equipment. WO 2015/169690 provides an alternative approach through the use of heterophasic ethylene-propylene copolymers as compatibilizers. Said heterophasic copolymers comprise a crystalline matrix and an elastomeric component which limits the stiffness loss but at the same time requires the addition of rather high amounts.

Therefore, it is an object of the present invention to provide a composition comprising recycled polypropylene and polyethylene featured by a high impact strength while the stiffness also remains on a high level.

Accordingly, the present invention is directed to a polyethylene-polypropylene composition, obtainable by blending
a) 85.0 to 99.0 wt.-%, based on the overall weight of the polyethylene-polypropylene composition, of a blend (A) comprising
  i) polypropylene, and
  ii) polyethylene,
  wherein the weight ratio of polypropylene to polyethylene is in the range of 3:7 to 7:3, and
  wherein blend (A) is a recycled material, which is recovered from a waste plastic material derived from post-consumer and/or industrial waste; and
b) 1.0 to 15.0 wt.-%, based on the overall weight of the polyethylene-polypropylene composition, of a compatibilizer (B) being a $C_2C_3C_4$ terpolymer having a density determined according to ISO 1183 equal or below 880 kg/m$^3$, preferably in the range of 850 to 875 kg/m$^3$, more preferably in the range of 855 to 872 kg/m$^3$, still more preferably in the range of 860 to 870 kg/m$^3$.

According to one embodiment of the present invention, the $C_2C_3C_4$ terpolymer has a melt flow rate MFR$_2$ (230° C., 2.16 kg) determined according to ISO 1133 in the range of 2.0 to 40.0 g/10 min, preferably in the range of 3.0 to 38.0 g/10 min, more preferably in the range of 3.5 to 35.0 g/10 min, still more preferably in the range of 4.0 to 30.0 g/10 min.

According to another embodiment of the present invention, the weight ratio between the blend (A) and the compatibilizer (B) is in the range of 99:1 to 5:1, preferably in the range of 49:1 to 7:1, more preferably in the range of 32:1 to 8:1, still more preferably in the range of 19:1 to 9:1.

According to a further embodiment of the present invention, the $C_2C_3C_4$ terpolymer has
i) an ethylene content in the range of 2.0 to 15.0 wt.-%, and/or
ii) a 1-butene content in the range of 5.0 to 30.0 wt.-%, based on the overall weight of the $C_2C_3C_4$ terpolymer.

According to one embodiment of the present invention, the $C_2C_3C_4$ terpolymer has a melting temperature Tm determined according to ISO 11357 below 180° C., preferably in the range of 120 to below 180° C., more preferably in the range of 140 to 170° C., still more preferably in the range of 150 to 165° C.

According to a further embodiment of the present invention, the $C_2C_3C_4$ terpolymer has a glass transition temperature Tg below −5° C., preferably in the range of −30 to below −5° C., more preferably in the range of −27 to −10° C., still more preferably the range of −25 to −12° C.

According to a first embodiment of the present invention, blend (A) has a content of limonene as determined by using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm. In a second embodiment, blend (A) has a content of limonene as determined by using solid phase microextraction (HS-SPME-GC-MS) of from 0.10 ppm to less than 1 ppm, preferably 0.10 to less than 0.85 ppm, most preferably 0.10 to less than 0.60 ppm.

According to a further embodiment of the present invention, blend (A) has a relative amount of units derived from ethylene of greater than 20 wt.-%, based on the overall weight of blend (A).

It is especially preferred that wherein blend (A) contains
i) up to 6.0 wt.-%, preferably 0.1 to 6.0 wt.-% polystyrene, and/or
ii) up to 3 wt.-%, preferably 0.1 to 3 wt.-% talc, and/or
iii) up to 5.0 wt.-%, preferably 0.2 to 5.0 wt.-% polyamide, and/or
iv) up to 3 wt.-%, preferably 0.1 to 3 wt.-% chalk,
based on the overall weight of blend (A).

According to one embodiment of the present invention, the polyethylene-polypropylene composition has a melt flow rate MFR$_2$ (230° C., 2.16 kg) determined according to ISO 1133 in the range of 0.1 to 50.0 g/10 min.

According to one embodiment of the present invention, the polyethylene-polypropylene composition has a Charpy notched impact strength determined according to ISO 179/1eA at 23° C. of at least 6.0 kJ/m$^2$, preferably in the range of 6.0 to 15.0 kJ/m$^2$, more preferably in the range of 7.0 to 10.0 kJ/m$^2$, still more preferably in the range of 8.0 to 9.0 kJ/m$^2$.

According to another embodiment of the present invention, the polyethylene-polypropylene composition has a tensile modulus determined according to ISO 527-2 of at least 600 MPa, preferably in the range of 600 to 830 MPa, more preferably in the range of 620 to 800 MPa, still more preferably in the range of 640 to 760 MPa.

The present invention is further directed to an article, comprising the polyethylene-polypropylene composition described above.

The present invention is also directed to a process for preparing the polyethylene-polypropylene composition described above, comprising the steps of
a) providing the blend (A) in an amount of 85.0 to 99.0 wt.-%, based on the overall weight of the polyethylene-polypropylene composition,
b) providing the compatibilizer (B) in an amount of 1.0 to 15.0 wt.-%, based on the overall weight of the polyethylene-polypropylene composition,
c) melting and mixing the blend of blend (A) and the compatibilizer (B), optionally in the presence of 0 to 1.0 wt.-% of a stabilizer or a mixture of stabilizers, and
d) optionally pelletizing.

It is especially preferred that the process includes the pelletizing step d).

The present invention is also directed to the use of a compatibilizer (B) being a $C_2C_3C_4$ terpolymer having
i) a density determined according to ISO 1183 equal or below 880 kg/m$^3$, preferably in the range of 850 to 875 kg/m$^3$, more preferably in the range of 855 to 872 kg/m$^3$, still more preferably in the range of 860 to 870 kg/m$^3$, and/or
ii) a melt flow rate $MFR_2$ (230° C., 2.16 kg) determined according to ISO 1133 in the range of 2.0 to 40.0 g/10 min, preferably in the range of 3.0 to 38.0 g/10 min, more preferably in the range of 3.5 to 35.0 g/10 min, still more preferably in the range of 4.0 to 30.0 g/10 min,
for improving the impact-stiffness balance of a blend (A) comprising
a) polypropylene, and
b) polyethylene,
wherein the weight ratio of polypropylene to polyethylene is in the range of 3:7 to 7:3, and
wherein blend (A) is a recycled material, which is recovered from a waste plastic material derived from post-consumer and/or industrial waste.

In the following, the present invention is described in more detail.

The Polyethylene-Polypropylene Composition

As outlined above, the present invention is directed to a polyethylene-polypropylene composition comprising a blend (A) of polypropylene and polyethylene and a compatibilizer (B) being a $C_2C_3C_4$ terpolymer.

In particular, the inventive polyethylene-polypropylene composition is obtainable by blending
a) 85.0 to 99.0 wt.-%, preferably 86.0 to 98.0 wt.-%, more preferably 87.0 to 98.0 wt.-%, still more preferably 88.0 to 95.0 wt.-%, yet more preferably 88.0 to 93.0 wt.-%, like 88.0 to 90.0 wt.-% of blend (A), and
b) 1.0 to 15.0 wt.-%, preferably 2.0 to 14.0 wt.-%, more preferably 3.0 to 13.0 wt.-%, still more preferably 5.0 to 12.0 wt.-%, yet more preferably 7.0 to 12.0 wt.-%, like 10.0 to 12.0 wt.-%, of the compatibilizer (B),
based on the overall weight of the polyethylene-polypropylene composition.

The polyethylene-polypropylene composition according to the present invention may further comprise additives (AD).

Accordingly, it is preferred that the inventive polyethylene-polypropylene composition is obtainable by blending
a) 85.0 to 99.0 wt.-%, preferably 86.0 to 98.0 wt.-%, more preferably 87.0 to 98.0 wt.-%, still more preferably 88.0 to 95.0 wt.-%, yet more preferably 88.0 to 93.0 wt.-%, like 88.0 to 90.0 wt.-% of blend (A),
b) 1.0 to 15.0 wt.-%, preferably 2.0 to 14.0 wt.-%, more preferably 3.0 to 13.0 wt.-%, still more preferably 5.0 to 12.0 wt.-%, yet more preferably 7.0 to 12.0 wt.-%, like 10.0 to 12.0 wt.-% of the compatibilizer (B), and
c) optionally 0.001 to 3.0 wt.-%, more preferably 0.01 to 2.0 wt.-%, like 0.1 to 1.0 wt.-% of additives (AD),
based on the overall weight of the polyethylene-polypropylene composition.

The additives (AD) are described in more detail below.

Further, it is preferred that the weight ratio between the blend (A) and the compatibilizer (B) is in the range of 99:1 to 5:1, more preferably in the range of 49:1 to 7:1, still more preferably in the range of 32:1 to 8:1, yet more preferably in the range of 19:1 to 9:1, like 9:1.

The polyethylene-polypropylene composition according to the invention preferably has a melt flow rate $MFR_2$ (230° C., 2.16 kg) determined according to ISO 1133 in the range of 0.1 to 50.0 g/10 min, more preferably in the range of 1.0 to 20.0 g/10 min, still more preferably in the range of 2.0 to 15.0 g/10 min, like in the range of 4.0 to 10.0 g/10 min.

As outlined above, it is appreciated that the polyethylene-polypropylene composition according to the invention is featured by a good impact strength without compromising the stiffness behavior.

Accordingly, it is preferred that the inventive polyethylene-polypropylene composition has a Charpy notched impact strength determined according to ISO 179/1eA at 23° C. of at least 6.0 kJ/m$^2$, more preferably in the range of 6.0 to 15.0 kJ/m$^2$, still more preferably in the range of 7.0 to 10.0 kJ/m$^2$, like in the range of 8.0 to 9.0 kJ/m$^2$.

Additionally, it is preferred that the inventive polyethylene-polypropylene composition has a tensile modulus determined according to ISO 527-2 of at least 600 MPa, more preferably in the range of 600 to 830 MPa, still more preferably in the range of 620 to 800 MPa, like in the range of 640 to 760 MPa.

In the following, the blend (A) of polypropylene and polyethylene and the compatibilizer (B) being a $C_2C_3C_4$ terpolymer are described in more detail.

The Blend (A)

The polyethylene-polypropylene composition according to the present invention comprises from 85.0 to 99.0 wt.-% of blend (A). It is the essence of the present invention that blend (A) is obtained from a recycled waste stream. Blend (A) can be either recycled post-consumer waste- or industrial waste, such as for example from the automobile industry, or alternatively, a combination of both.

It is particularly preferred that blend (A) consists of recycled post-consumer waste and/or industrial waste.

For the purposes of the present description and of the subsequent claims, the term "recycled waste" is used to indicate a material recovered from both post-consumer waste and industrial waste, as opposed to virgin polymers. Post-consumer waste refers to objects having completed at least a first use cycle (or life cycle), i.e. having already served their first purpose; while industrial waste refers to manufacturing scrap, which does not normally reach a consumer.

The term "virgin", on the other hand, denotes the newly produced materials and/or objects prior to their first use, which have not already been recycled.

Many different kinds of polyethylene or polypropylene can be present in "recycled waste".

In particular, the polypropylene fraction can comprise: isotactic propylene homopolymers, random copolymers of propylene with ethylene and/or C4-C8 α-olefins, heterophasic copolymers comprising a propylene homopolymer and/ or at least one C2 or C4-C8 α-olefin copolymer and an elastomeric fraction comprising copolymers of ethylene with propylene and/or a C4-C8 α-olefin, optionally containing minor amounts of a diene.

Likewise, the polyethylene fraction can comprise ethylene homopolymers or random copolymers of ethylene with propylene and/or C4-C8 α-olefins. The polyethylene fraction of the recycled material can comprise recycled high-density polyethylene (rHDPE), recycled medium-density polyethylene (rMDPE), recycled low-density polyethylene (rLDPE), recycled linear low density polyethylene (rLLDPE) and the mixtures thereof. In a certain embodiment, the recycled material is high density PE with an average density of greater than 0.7 g/cm$^3$, preferably greater than 0.75 g/cm$^3$, most preferably greater than 0.8 g/cm$^3$.

The term "recycled material" such as used herein denotes materials reprocessed from "recycled waste".

A polymer blend is a mixture of two or more polymeric components. In general, the blend can be prepared by mixing the two or more polymeric components. Suitable mixing procedures known in the art are post-polymerization blending procedures. Post-polymerization blending can be dry blending of polymeric components such as polymer powders and/or compounded polymer pellets or melt blending by melt mixing the polymeric components.

The polypropylene/polyethylene weight ratio in the blend (A) is in the range of from 7:3 to 3:7.

Preferably, blend (A) is obtained from recycled waste by means of plastic recycling processes known in the art. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polyethylene rich recycled materials include: DIPOLEN S (Mtm Plastics GmbH), food grade rHDPE (BIFFA PLC) and a range of polyethylene rich materials, such as e.g. HD-LM02041 from PLASgran Ltd.

In a certain preferred embodiment, the recycled polyethylene rich material is DIPOLEN (Mtm Plastics GmbH), such as DIPOLEN S or DIPOLEN H, DIPOLEN PP or Dipolen SP, preferably DIPOLEN S. DIPOLEN is obtained from domestic waste streams (i.e. it is a product of domestic recycling) for example the "yellow bag" recycling system, which operates in some parts of Germany.

The combined polypropylene and polyethylene fractions of blend (A) may have a relative amount of units derived from ethylene of greater than 20 wt.-%, preferably greater than 27 wt.-%, more preferably greater than 30 wt.-%, still more preferably greater than 35 wt.-%, most preferably greater than 40 wt.-% with respect to the total weight of blend (A).

In addition, the combined polypropylene and polyethylene fractions of blend (A) may have a relative amount of units derived from propylene of greater than 30 wt.-%, but less than 70 wt.-%, with respect to the total weight of blend (A).

According to a first embodiment of the present invention, blend (A) preferably has a content of limonene as determined using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm. Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams. In a second embodiment of the present invention, blend (A) has a content of limonene as determined by using solid phase microextraction (HS-SPME-GC-MS) of from 0.10 ppm to less than 1 ppm, preferably 0.10 to less than 0.85 ppm, most preferably 0.10 to less than 0.60 ppm. Blend (A) according to the second embodiment can be prepared by subjecting blend (A) according to the first embodiment to washing and/or aeration. Washing can be effected by industrial washers such as provided by Herbold Meckesheim GmbH. Depending on the origin of the waste stream, several washing cycles may be necessary. Various aeration processes such as described in U.S. Pat. No. 5,767,230 are also known in the art. U.S. Pat. No. 5,767,230 is incorporated by reference herewith. The process as described in U.S. Pat. No. 5,767,230 is preferably combined with a washing stage as described above.

The fatty acid content is yet another indication of the recycling origin of blend (A).

Due to the recycling origin blend (A) may also contain:
i) organic fillers, and/or
ii) inorganic fillers, and/or
iii) additives
in amounts of up to 4 wt.-% with respect to the weight of blend (A).

Blend (A) preferably contains
(i) up to 6.0 wt.-% polystyrene; and/or
(ii) up to 3 wt.-% talc; and/or
(iii) up to 5.0 wt.-% polyamide; and/or
(iv) up to 3 wt.-% chalk,
based on the overall weight of blend (A).

Blend (A) typically contains
(i) 0.1 to 6.0 wt.-% polystyrene; and/or
(ii) 0.1 to 3 wt.-% talc; and/or
(iii) 0.2 to 5.0 wt.-% polyamide; and/or
(iv) 0.1 to 3 wt.-% chalk,
based on the overall weight of blend (A).

Blend (A) may further contain polyethylene terephthalate (PET) and polyvinylchloride (PVC). Preferably, blend (A) further contains
(vi) up to 5.0 wt.-%, more preferably 0.2 to 5.0 wt.-% polyethylene terephthalate (PET), and/or
(vii) up to 5.0 wt.-%, more preferably 0.2 to 5.0 wt.-% polyvinylchloride (PVC),
based on the overall weight of blend (A).

The Compatibilizer (B)

The inventive polyethylene-polypropylene composition further comprises a compatibilizer (B).

A "compatibilizer" is a substance in polymer chemistry which is added to an immiscible blend of polymers in order to increase its stability.

The compatibilizer (B) according to the present invention is a $C_2C_3C_4$ terpolymer, i.e. a copolymer of propylene, ethylene and 1-butene.

Preferably, said $C_2C_3C_4$ terpolymer has an ethylene content in the range of 2.0 to 15.0 wt.-%, more preferably in the range of 3.0 to 12.0 wt.-%, still more preferably in the range of 4.0 to 10.0 wt.-%, like in the range of 4.5 to 9.0 wt.-%, based on the overall weight of the $C_2C_3C_4$ terpolymer.

Additionally or alternatively, it is preferred that the $C_2C_3C_4$ terpolymer has a 1-butene content in the range of 5.0 to 30.0 wt.-%, more preferably in the range of 5.5 to 27.0 wt.-%, still more preferably in the range of 6.0 to 23.0 wt.-%, like in the range of 7.0 to 20.0 wt.-%, based on the overall weight of the $C_2C_3C_4$ terpolymer.

Further, it is preferred that the $C_2C_3C_4$ terpolymer has a melt flow rate MFR$_2$ (230° C., 2.16 kg) determined according to ISO 1133 in the range of 2.0 to 40.0 g/10 min, more preferably in the range of 3.0 to 38.0 g/10 min, still more preferably in the range of 3.5 to 35.0 g/10 min, like in the range of 4.0 to 30.0 g/10 min.

The $C_2C_3C_4$ terpolymer preferably has a melting temperature Tm determined according to ISO 11357 below 180° C., more preferably in the range of 120 to below 180° C., still more preferably in the range of 140 to 170° C., like in the range of 150 to 165° C.

Additionally, it is preferred that the $C_2C_3C_4$ terpolymer has a glass transition temperature below −5° C., more preferably in the range of −30 to below −5° C., still preferably in the range of −27 to −10° C., like in the range of −25 to −12° C.

The compatibilizer (B) has a density determined according to ISO 1183 equal or below 880 kg/m³, more preferably in the range of 850 to 875 kg/m³, still more preferably in the range of 855 to 872 kg/m³, like in the range of 860 to 870 kg/m³.

It is preferred that the compatibilizer (B) is a $C_2C_3C_4$ terpolymer known in the art, for example a $C_2C_3C_4$ terpolymer of the TAFMER series commercially available from Mitsui.

The Additives (AD)

As indicated above, the polyethylene-polypropylene composition according to the invention may contain additives.

In particular, the polyethylene-polypropylene composition of the present invention may contain up to 1.0 wt.-% of a stabilizer or a mixture of stabilizers. Preferably stabilizers are contained in an amount of 0.1 to 1.0 wt.-%, based on the total weight of the polyethylene-polypropylene composition.

Stabilizers are well known in the art and can be for example antioxidants, anti-acids, antiblocking agents, anti-UV's, nucleating agents or antistatic agents.

Examples of antioxidants which are commonly used in the art, are sterically hindered phenols (such as CAS No. 6683-19-8, also sold as Irganox 1010 FF™ by BASF, or Irganox 225™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethyl-benzyl)diphenylamine), or antioxidant blends.

Anti-acids are also commonly known in the art. Examples are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1);

Common antiblocking agents are natural silica such as diatomaceous earth (such as CAS No. 60676-86-0 (SuperfFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

Anti-UVs are, for example, Bis-(2,2,6,6-tetramethyl-4-piperidyl)-sebacate (CAS-No. 52829-07-9, Tinuvin 770); 2-hydroxy-4-n-°Ctoxy-benzophenone (CAS-No. 1843-05-6, Chimassorb 81).

Nucleating agents like sodium benzoate (CAS No. 532-32-1); 1,3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these stabilizers are added in quantities of 100-2.000 ppm for each individual component of the polymer The polyethylene-polypropylene composition preferably contains between 1.0 and 2.0 wt.-% PO ash.

The Process

The process according to the present invention for providing a polyethylene-polypropylene composition comprises the steps of:
a) providing the blend (A) in an amount of 85.0 to 99.0 wt.-%, based on the overall weight of the polyethylene-polypropylene composition,
b) providing the compatibilizer (B) in an amount of 1.0 to 15.0 wt.-%, based on the overall weight of the polyethylene-polypropylene composition,
c) melting and mixing the blend of blend (A) and the compatibilizer (B), optionally in the presence of 0 to 1.0 wt.-% of a stabilizer or a mixture of stabilizers, and
d) optionally pelletizing.

It is especially preferred that the process includes the pelletizing step d).

Accordingly, it is preferred that the process for providing the polyethylene-polypropylene composition comprises the steps of
a) providing the blend (A) in an amount of 85.0 to 99.0 wt.-%, based on the overall weight of the polyethylene-polypropylene composition,
b) providing the compatibilizer (B) in an amount of 1.0 to 15.0 wt.-%, based on the overall weight of the polyethylene-polypropylene composition,
c) melting and mixing the blend of blend (A) and the compatibilizer (B), optionally in the presence of 0 to 1.0 wt.-% of a stabilizer or a mixture of stabilizers, and
d) pelletizing.

All preferred aspects, definitions and embodiments as described above shall also hold for the process.

The Use

The present invention is further directed to the use of a compatibilizer (B) being a $C_2C_3C_4$ terpolymer having
i) a density determined according to ISO 1183 equal or below 880 kg/m³, and/or
ii) a melt flow rate $MFR_2$ (230° C., 2.16 kg) determined according to ISO 1133 in the range of 2.0 to 40.0 g/10 min
for improving the impact-stiffness balance of a blend (A) comprising
a) polypropylene, and
b) polyethylene,
wherein the weight ratio of polypropylene to polyethylene is in the range of 3:7 to 7:3, and
wherein blend (A) is a recycled material, which is recovered from a waste plastic material derived from post-consumer and/or industrial waste.

All preferred aspects, definitions and embodiments as described above shall also hold for the use.

EXPERIMENTAL SECTION

The following Examples are included to demonstrate certain aspects and embodiments of the invention as described in the claims. It should be appreciated by those of skill in the art, however, that the following description is illustrative only and should not be taken in any way as a restriction of the invention.

Test Methods

The tensile modulus (TM) was measured according to ISO 527-2 (cross head speed=1 mm/min for determination of the modulus, thereafter switching to 50 mm/min until break at 23° C.) using injection moulded specimens as described in EN ISO 5247-2 (dog bone shape, 4 mm thickness). The measurement was done after 96 h conditioning time of the specimen.

The impact strength was determined as Charpy Notched Impact Strength (NIS) according to ISO 179-1eA at +23° C. on injection moulded specimens of 80×10×4 mm prepared according to EN ISO 1873-2. According to this standard samples are tested after 96 hours.

Comonomer Content poly(propylene-co-ethylene-co-butene)

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe head at 180° C. using nitrogen gas for all pneumatics.

Approximately 200 mg of material was packed into a 7 mm outer diameter zirconia MAS rotor and spun at 4.5 kHz. This setup was chosen primarily for the high sensitivity needed for rapid identification and accurate quantification {1, 2, 6} Standard single-pulse excitation was employed utilising the NOE at short recycle delays {3, 1} and the RS-HEPT decoupling scheme {4, 5}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to regio defects were not observed {11}. The amount of propene was quantified based on the main Sαα methylene sites at 44.1 ppm:

Ptotal=$I_{S\alpha\alpha}$

Characteristic signals corresponding to the incorporation of 1-butene were observed and the comonomer content quantified in the following way. The amount isolated 1-butene incorporated in PPBPP sequences was quantified using the integral of the αB2 sites at 44.1 ppm accounting for the number of reporting sites per comonomer:

B=$I_{\alpha B}2/2$

The amount consecutively incorporated 1-butene in PPBBPP sequences was quantified using the integral of the ααB2 site at 40.5 ppm accounting for the number of reporting sites per comonomer:

BB=2*$L_{\alpha\alpha B}2$

The total 1-butene content was calculated based on the sum of isolated and consecutively incorporated 1-butene:

Btotal=B+BB

The total mole fraction of 1-butene in the polymer was then calculated as: fB=(Btotal/(Etotal+Ptotal+Btotal))

Characteristic signals corresponding to the incorporation of ethylene were observed and the comonomer content quantified in the following way. The amount isolated ethylene incorporated in PPEPP sequences was quantified using the integral of the Sαγ sites at 37.9 ppm accounting for the number of reporting sites per comonomer:

E=$I_{S\alpha\gamma}$/2

With no sites indicative of consecutive incorporation observed the total ethylene comonomer content was calculated solely on this quantity:

Etotal=E

The total mole fraction of ethylene in the polymer was then calculated as:

fE=(Etotal/(Etotal+Ptotal+Btotal))

The mole percent comonomer incorporation was calculated from the mole fractions:

B [mol %]=100*fB

E [mol %]=100*fE

The weight percent comonomer incorporation was calculated from the mole fractions:

B [wt %]=100*(fB*56.11)/((fE*28.05)+(fB*56.11)+((1−(fE+fB))*42.08))

E [wt %]=100*(fE*28.05)/((fE*28.05)+(fB*56.11)+((1−(fE+fB))*42.08))

BIBLIOGRAPHIC REFERENCES

1) Klimke, K., Parkinson, M., Piel, C., Kaminsky, W., Spiess, H. W., Wilhelm, M., Macromol. Chem. Phys. 2006; 207:382.
2) Parkinson, M., Klimke, K., Spiess, H. W., Wilhelm, M., Macromol. Chem. Phys. 2007; 208:2128.
3) Pollard, M., Klimke, K., Graf, R., Spiess, H. W., Wilhelm, M., Sperber, O., Piel, C., Kaminsky, W., Macromolecules 2004; 37:813.
4) Filip, X., Tripon, C., Filip, C., J. Mag. Resn. 2005, 176, 239.
5) Griffin, J. M., Tripon, C., Samoson, A., Filip, C., and Brown, S. P., Mag. Res. in Chem. 2007 45, S1, S198.
6) Castignolles, P., Graf, R., Parkinson, M., Wilhelm, M., Gaborieau, M., Polymer 50 (2009) 2373.
7) Busico, V., Cipullo, R., Prog. Polym. Sci. 26 (2001) 443.
8) Busico, V., Cipullo, R., Monaco, G., Vacatello, M., Segre, A. L., Macromolecules 30 (1997) 6251.
9) Zhou, Z., Kuemmerle, R., Qiu, X., Redwine, D., Cong, R., Taha, A., Baugh, D. Winniford, B., J. Mag. Reson. 187 (2007) 225.
10) Busico, V., Carbonniere, P., Cipullo, R., Pellecchia, R., Severn, J., Talarico, G., Macromol. Rapid Commun. 2007, 28, 1128.
11) Resconi, L., Cavallo, L., Fait, A., Piemontesi, F., Chem. Rev. 2000, 100, 1253.

Ratio of units derived from C2 and C3: The ethylene content of blend (A) was determined by quantitative Fourier transform infrared spectroscopy (FTIR) calibrated to results obtained from quantitative $^{13}C$ NMR spectroscopy.

Thin films were pressed to a thickness of between 300 to 500 μm at 190° C. and spectra recorded in transmission mode. Relevant instrument settings include a spectral window of 5000 to 400 wave-numbers (cm$^{-1}$), a resolution of 2.0 cm$^{-1}$ and 8 scans.

Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-d2 (TCE-d2) along with chromium (III) acetylacetonate $(Cr(acac)_3)$ resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the ethylene fraction calculated as the fraction of ethylene in the blend with respect to all monomer in the polymer: fE=(E/(P+E) The ethylene fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents. The mole percent of ethylene was calculated from the mole fraction: E [mol %]=100*fE. The weight percent comonomer incorporation was calculated from the mole fraction: E [wt %]=100*(fE*28.06)/ ((fE*28.06)+((1−fE)*42.08))

iPP, PE, PS, PA and PE Content:

Calibration standards were prepared by blending iPP and HDPE to create a calibration curve. The thickness of the films of the calibration standards were 300 μm. For the quantification of the iPP, PS and PA 6 content in the samples quantitative IR spectra were recorded in the solid-state using a Bruker Vertex 70 FTIR spectrometer. Spectra were recorded on 25×25 mm square films of 50-100 μm thickness prepared by compression moulding at 190° C. and 4-6 mPa. Standard transmission FTIR spectroscopy was employed using a spectral range of 4000-400 $cm^{-1}$, an aperture of 6 mm, a spectral resolution of 2 $cm^{-1}$, 16 background scans, 16 spectrum scans, an interferogram zero filling factor of 32 and Norton Beer strong anodization.

The absorption of the band at 1167 $cm^{-1}$ in iPP is measured and the iPP content is quantified according to a calibration curve (absorption/thickness in cm versus iPP content in weight %).

The absorption of the band at 1601 $cm^{-1}$ (PS) and 3300 $cm^{-1}$ (PA6) are measured and the PS and PA6 content quantified according to the calibration curve (absorption/ thickness in cm versus PS and PA content in wt %). The PE content is obtained by subtracting iPP, PS and PA6 from 100. The analysis is performed as double determination.

Talc and chalk content: measured by Thermogravimetric Analysis (TGA); experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. ($WCO_2$) was assigned to $CO_2$ evolving from $CaCO_3$, and therefore the chalk content was evaluated as:

$$\text{Chalk content}=100/44 \times WCO_2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$\text{Ash content}=(\text{Ash residue})-56/44 \times WCO_2 - Wcb$$

Where Ash residue is the weight % measured at 900° C. in the first step conducted under nitrogen. The ash content is estimated to be the same as the talc content for the investigated recyclates.

MFR: melt flow rates were measured with a load of 2.16 kg ($MFR_2$) at 230° C. or 190° C. as indicated. The melt flow rate is that quantity of polymer in grams which the test apparatus standardized to ISO 1133 extrudes within 10 minutes at a temperature of 230° C. (or 190° C.) under a load of 2.16 kg.

The melting temperature was determined by means of DSC in accordance with ISO 11357.

The glass transition temperature Tg is determined by dynamic mechanical analysis according to ISO 6721-7. The measurements are done in torsion mode on compression moulded samples (40×10×1 $mm^3$) between −100° C. and +150° C. with a heating rate of 2° C./min and a frequency of 1 Hz.

The density was determined according to ISO 1183.

Limonene Content in DIPOLEN

Measurement

Limonene quantification was carried out using solid phase microextraction (HS-SPME-GC-MS) by standard addition.

50 mg ground samples were weighed into 20 mL headspace vials and after the addition of limonene in different concentrations and a glass-coated magnetic stir bar, the vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene were used in combination with some of the samples tested in this application. For quantification, ion-93 acquired in SIM mode was used. Enrichment of the volatile fraction was carried out by headspace solid phase microextraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:

Column: 30 m HP 5 MS 0.25*0.25

Injector: Splitless with 0.75 mm SPME Liner, 270° C.

Temperature program: −10° C. (1 min)

Carrier gas: Helium 5.0, 31 cm/s linear velocity, constant flow

MS: Single quadrupole, direct interface, 280° C. interface temperature

Acquisition: SIM scan mode

Scan parameter: 20-300 amu

SIM Parameter: m/Z 93, 100 ms dwell time

TABLE 1

Limonene content in DIPOLEN (Blend (A))

| Sample | Limonene [mg/kg] HS-SPME-GC-MS[1] |
|---|---|
| Dipolen S | 31.5 ± 2.6 |

[1]Headspace Soldiphase Microextraction. Materials available from mtm plastics GmbH, according to 2018 specifications.

Total Free Fatty Acid Content

Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass coated magnetic stir bar the vial was closed with a magnetic cap lined with silicone/PTFE. 10 µL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:

Column: 20 m ZB Wax plus 0.25*0.25

Injector: Split 5:1 with glass lined split liner, 250° C.

Temperature program: 40° C. (1 min) @6° C./min to 120° C., @15° C. to 245° C. (5 min)

Carrier: Helium 5.0, 40 cm/s linear velocity, constant flow

MS: Single quadrupole, direct interface, 220° C. inter face temperature

Acquisition: SIM scan mode

Scan parameter: 46-250 amu 6.6 scans/s

SIM Parameter: m/z 60.74, 6.6 scans/s

TABLE 2

Total fatty acid content in Dipolen (Blend (A))

| Sample | Total fatty acid concentration [mg/kg][1] |
|---|---|
| Dipolen S | 70.6 |

[1]The concentration of acetic acid, propionic acid, butyric acid, pentanoic acid, hexanoic acid octanoic acid, nonanoic acid and decanoic acid in each sample was added together to give a totally fatty acid concentration value.

Experiments

A number of blends were produced with DIPOLEN S as blend (A), a polyethylene-polypropylene blend from Mtm Plastics GmbH, materials according to the August 2018 specifications.

In each of the blends 5 to 10 wt.-% of a reactor-derived compatibilizer (B) was added. As compatibilizer (B) the following commercially available terpolymers were used:

TABLE 3

Properties of the compatibilizers (B)

| Compatibilizer | | B1 Tafmer PN 0040 | B2 Tafmer PN 20300 |
|---|---|---|---|
| MFR | [g/10 min] | 4.0 | 30.0 |
| Tm | [° C.] | 160 | 160 |
| Tg | [° C.] | −16 | −26 |
| Density | [kg/m$^3$] | 868 | 868 |
| C2 | [wt.-%] | 4.7 | 19.9 |
| C4 | [wt.-%] | 8.9 | 7.1 |

The compositions were prepared via melt blending on a co-rotating twin screw extruder with 0.3 wt.-% Irganox B225F (AO) as stabilizer. The polymer melt mixture was discharged and pelletized. For testing the mechanical properties, specimens were produced and tested according to ISO 179 with 1eA notched specimens to measure the Charpy notched impact strength (NIS) and according to ISO 527-1/2 with 1A specimens to measure the tensile properties at room temperature. The results are summarized in Table 4.

TABLE 4

Composition and properties of the inventive and comparative examples

| | | CE1 | IE1 | IE2 | IE3 | IE4 |
|---|---|---|---|---|---|---|
| A | [wt.-%] | 99.7 | 94.7 | 89.7 | 94.7 | 89.7 |
| B1 | [wt.-%] | — | 5 | 10 | — | — |
| B2 | [wt.-%] | — | — | — | 5 | 10 |
| AO | [wt.-%] | 0.3 | 0.3 | 0.3 | 0.3 | 0.3 |
| NIS | [kJ/m$^2$] | 5.7 | 6.8 | 8.9 | 6.4 | 8.2 |
| TM | [MPa] | 850 | 736 | 640 | 755 | 641 |

As can be gathered from Table 4, the compositions according to the inventive examples have a higher impact strength than the reference which contains no compatibilizer while the tensile modulus remains on a high level.

The invention claimed is:

1. A polyethylene-polypropylene composition, obtained by blending:
  a) 85.0 to 99.0 wt. %, based on an overall weight of the polyethylene-polypropylene composition, of a blend (A) comprising:
    i) polypropylene, and
    ii) polyethylene,
    wherein a weight ratio of polypropylene to polyethylene is in a range of 3:7 to 7:3, and
    wherein blend (A) is a recycled material, which is recovered from a waste plastic material derived from post-consumer and/or industrial waste;
    and
  b) 1.0 to 15.0 wt. %, based on the overall weight of the polyethylene-polypropylene composition, of a compatibilizer (B) which is a $C_2C_3C_4$ terpolymer having a density determined according to ISO 1183 equal or below 880 kg/m$^3$.

2. The polyethylene-polypropylene composition according to claim 1, wherein the $C_2C_3C_4$ terpolymer has a melt flow rate $MFR_2$ (230° C., 2.16 kg) determined according to ISO 1133 in a range of 2.0 to 40.0 g/10 min.

3. The polyethylene-polypropylene composition according to claim 1, wherein a weight ratio between the blend (A) and the compatibilizer (B) is in a range of 99:1 to 5:1.

4. The polyethylene-polypropylene composition according to claim 1, wherein the $C_2C_3C_4$ terpolymer has:

i) an ethylene content in a range of 2.0 to 15.0 wt. %, and/or ii) a 1-butene content in a range of 5.0 to 30.0 wt. %, based on an overall weight of the $C_2C_3C_4$ terpolymer.

5. The polyethylene-polypropylene composition according to claim 1, wherein the $C_2C_3C_4$ terpolymer has a melting temperature Tm determined according to ISO 11357-below 180° C. a range of 150 to 165° C.

6. The polyethylene-polypropylene composition according to claim 1, wherein the $C_2C_3C_4$ terpolymer has a glass transition temperature Tg-below −5° C. in a range of −25 to −12° C.

7. The polyethylene-polypropylene composition according to claim 1, wherein blend (A) has a content of limonene as determined by using solid phase microextraction (HS-SPME-GC-MS) of
   (i) from 1 ppm-to 100 ppm or
   (ii) from 0.10 ppm to less than 1 ppm.

8. The polyethylene-polypropylene composition according to claim 1, wherein blend (A) has a relative amount of units derived from ethylene of greater than 20 wt. %, based on an overall weight of blend (A).

9. The polyethylene-polypropylene composition according to claim 1, wherein blend (A) contains:
   i) up to 6.0 wt. % polystyrene, and/or
   ii) up to 3 wt. % talc, and/or
   iii) up to 5.0 wt. %, polyamide, and/or
   iv) up to 3 wt. % chalk,
   based on an overall weight of blend (A).

10. The polyethylene-polypropylene composition according to claim 1, having a melt flow rate $MFR_2$ (230° C., 2.16 kg) determined according to ISO 1133 in a range of 0.1 to 50.0 g/10 min.

11. The polyethylene-polypropylene composition according to claim 1, having a Charpy notched impact strength determined according to ISO 179/1eA at 23° C. of at least 6.0 KJ/m$^2$.

12. The polyethylene-polypropylene composition according to claim 1, having a tensile modulus determined according to ISO 527-2 of at least 600 MPa.

13. An article, comprising the polyethylene-*polypropylene composition according to claim 1.

14. A process for preparing the polyethylene-polypropylene composition according to claim 1, comprising the steps of:
   a) providing the blend (A) in an amount of 85.0 to 99.0 wt. %, based on the overall weight of the polyethylene-polypropylene composition,
   b) providing the compatibilizer (B) in an amount of 1.0 to 15.0 wt. %, based on the overall weight of the polyethylene-polypropylene composition,
   c) melting and mixing a blend of blend (A) and the compatibilizer (B), optionally in the presence of 0 to 1.0 wt. % of a stabilizer or a mixture of stabilizers, and
   d) optionally pelletizing.

* * * * *